US012605934B2

(12) United States Patent
Kamano et al.

(10) Patent No.: US 12,605,934 B2
(45) Date of Patent: Apr. 21, 2026

(54) METHOD OF MANUFACTURING LIQUID DISCHARGING HEAD AND LIQUID DISCHARGING HEAD

(71) Applicant: CANON KABUSHIKI KAISHA, Tokyo (JP)

(72) Inventors: Naoyuki Kamano, Tokyo (JP); Junichiro Iri, Kanagawa (JP); Takanobu Manabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 174 days.

(21) Appl. No.: 18/486,842

(22) Filed: Oct. 13, 2023

(65) Prior Publication Data

US 2024/0123731 A1 Apr. 18, 2024

(30) Foreign Application Priority Data

Oct. 17, 2022 (JP) ................................ 2022-166036

(51) Int. Cl.
*B41J 2/16* (2006.01)
*B41J 2/14* (2006.01)

(52) U.S. Cl.
CPC ............... *B41J 2/1635* (2013.01); *B41J 2/14* (2013.01); *B41J 2/1607* (2013.01); *B41J 2/1629* (2013.01); *B41J 2002/14491* (2013.01); *B41J 2202/22* (2013.01)

(58) Field of Classification Search
CPC . B41J 2/1635; B41J 2/14; B41J 2/1607; B41J 2/1629; B41J 2002/14491; B41J 2202/22; B41J 2/1623; B41J 2/1626; B41J 2/1631; B41J 2/1632; B41J 2/1643; B41J 2/1645; B41J 2/14072; B41J 2/1603
See application file for complete search history.

(56) References Cited

FOREIGN PATENT DOCUMENTS

| | | | | |
|---|---|---|---|---|
| JP | 2006281679 | A | | 10/2006 |
| JP | 2021088158 | A | * | 6/2021 |

OTHER PUBLICATIONS

Nojo Nariyuki et al., "Recording Element Substrate, Liquid Discharge Head and Method for Manufacturing Them" (JP 2021088158 A), [Abstract, Description Of Embodiments]. (Year: 2021).*

* cited by examiner

*Primary Examiner* — Lisa Solomon
(74) *Attorney, Agent, or Firm* — Canon U.S.A., Inc., IP Division

(57) ABSTRACT

A method of manufacturing a liquid discharging head includes preparing a wafer provided with an element and a discharge port formation member on a front surface of the wafer, forming a recessed portion in a rear surface of the wafer, attaching the rear surface of the wafer and a dicing tape, cutting the wafer along cutting lines to form an element board, and connecting an electric wiring board and a terminal of the element board. The element board includes a discharge port formation member having a discharge port for discharging liquid and includes the element to supply energy to the discharge port for liquid discharge. The recessed portion is formed at a location corresponding to the cutting lines, and an area of a region where the terminal overlaps the recessed portion is smaller than an area of a region where the terminal does not overlap the recessed portion.

11 Claims, 16 Drawing Sheets

METHOD OF MANUFACTURING LIQUID DISCHARGING HEAD AND LIQUID DISCHARGING HEAD

BACKGROUND

Field

The present disclosure relates to a method of manufacturing a liquid discharging head, used in a liquid discharging apparatus, such as an ink jet printer, and to the liquid discharging head.

Description of the Related Art

A conventional element board that constitutes a discharging portion of a liquid discharging head, such as an ink jet head, is manufactured by a manufacturing method similar to a semiconductor manufacturing process. That is, patterns of, for example, energy generating elements or discharge port portions are formed in a few tens of units to a few hundreds of units on a wafer having a size of approximately ϕ3 to ϕ8 inches by a thin-film process using a photolithography technology, and then are cut off to form individual element boards. An example of a method of cutting the wafer at this time is a method in which scratches are formed in the wafer with a diamond having a sharp tip, and then a bending force or a pull force is applied to the wafer to divide the wafer. However, in this method, dimensional accuracy is very poor and the wafer is frequently chipped, as a result of which it is extremely difficult to control the bending force and the pull force of the wafer.

Japanese Patent Laid-Open No. 2006-281679 discloses a method of manufacturing a liquid discharging head, which suppresses a burr portion that has not been cut from becoming waste in a cutting operation using a dicing blade. Specifically, a recessed portion is formed in the method in a rear surface of the wafer in correspondence with a cutting line and the dicing blade cuts into the wafer until the dicing blade protrudes to a recessed location on a rear surface side of the wafer.

The above noted conventional element board that constitutes the discharging portion of the liquid discharging head may be connected to an electric wiring board through an electric input terminal provided on the conventional element board, where the electric wiring board is for supplying from a liquid discharging apparatus body an electric signal for discharging liquid droplets. Such an electric input terminal is frequently formed near an outer periphery of the conventional element board. In some cases, a recessed portion formed in correspondence with a cutting line of a dicing blade results in a slope in an end face at the outer periphery of the conventional element board after dicing. In connecting the electric input terminal and the electric wiring board to each other, they are joined together by providing a load, temperature, or energy, such as ultrasonic vibration energy, to the electric input terminal from the electric wiring board. Therefore, when the slope resulting from the recessed portion exists directly below the electric input terminal in a perpendicular direction, a load that is applied to the electric input terminal from an electric-wiring-board side may not be received by a bottom face of the element board. Consequently, a crack, scratch, or the like may be formed in the element board with the slope being a starting point. In particular, when the electric input terminal and the electric wiring board are joined to each other by ultrasonic vibration, a crack, a scratch, or the like may tend to be formed in the conventional element board.

SUMMARY

The present disclosure provides a method of manufacturing a liquid discharging head and the liquid discharging head, which suppress formation of a fragment that is formed at the time of dicing, in which an element board is cut out from a wafer, and which make it unlikely for cracking to occur in joining the element board and the electric wiring board to each other.

According to an aspect of the present disclosure, a method of manufacturing a liquid discharging head having an element board and an electric wiring board that is electrically connected to the element board, wherein the element board includes a discharge port formation member having a discharge port for discharging liquid and the element board further includes an element configured to supply energy to the discharge port for discharging the liquid, the method includes preparing a wafer that is provided with the element and the discharge port formation member on a front surface of the wafer, forming a recessed portion in a rear surface of the wafer, attaching the rear surface of the wafer and a dicing tape, cutting the wafer along a plurality of cutting lines formed on the front surface of the wafer and forming the element board, and connecting the electric wiring board and a terminal of the element board, wherein, when seen from a direction perpendicular to the front surface of the wafer, the recessed portion is formed at a location corresponding to the plurality of cutting lines, and an area of a region where the terminal overlaps the recessed portion is smaller than an area of a region where the terminal does not overlap the recessed portion.

Further features of the present disclosure will become apparent from the following description of exemplary embodiments with reference to the attached drawings.

DESCRIPTION OF THE EMBODIMENTS

A liquid discharging head and a method of manufacturing the liquid discharging head according to an exemplary embodiment of the present disclosure are described below with reference to the drawings. The liquid discharging head of the present disclosure can be suitably used as an ink jet head of an ink jet device (hereunder may also be referred to as "device body").

Figure 1A:
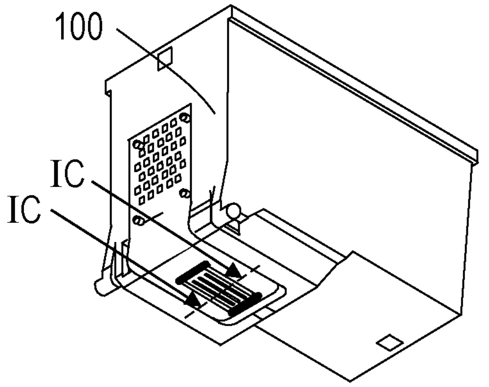
FIG. 1A and FIG. 1B are each a perspective view showing an example of a liquid discharging head according to the present disclosure.
Figure 1B:
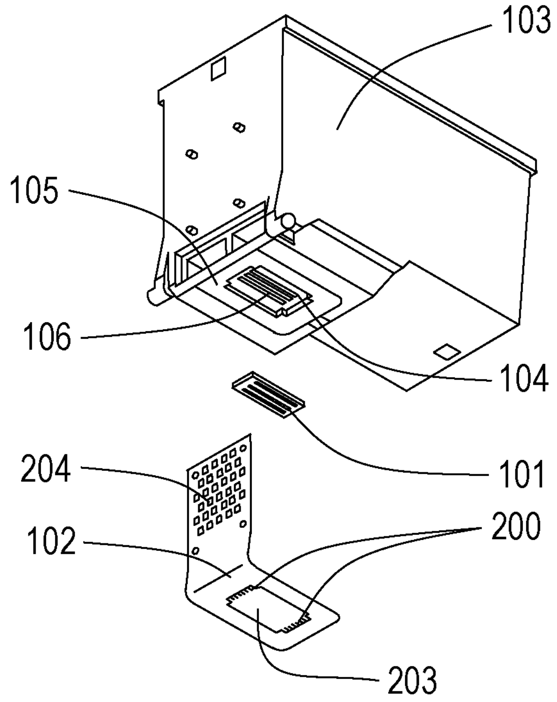
Figure 1C:
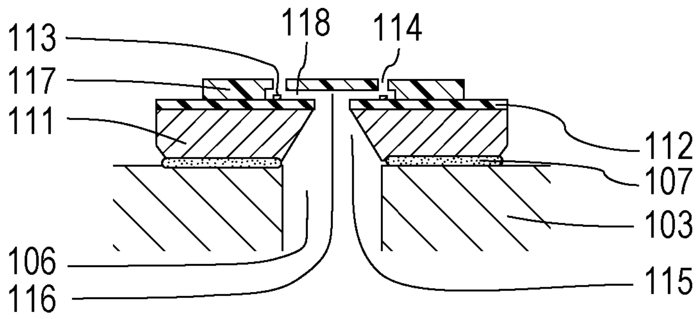
FIG. 1C is a cross-sectional view along line IC-IC in FIG. 1A.

FIG. 1A is a perspective view schematically showing a structure of the liquid discharging head. FIG. 1B is an exploded perspective view of the liquid discharging head that is shown in FIG. 1A and that is shown in a partly exploded manner. FIG. 1C is a cross-sectional view showing a main portion of the liquid discharging head of the present disclosure, and is a cross-sectional view along line IC-IC in FIG. 1A. A liquid discharging head 100 includes an element board 101 that discharges a liquid, such as ink, an electric wiring board 102 that is electrically connected to the element board, and a supporting member 103 that supports the element board 101 and the electric wiring board 102.

The supporting member 103 includes a supporting portion 104 that supports the element board 101, a supporting portion 105 that supports the electric wiring board 102, and a flow path 106 for supplying a liquid to the element board 101. The supporting portion 104 has a size that allows it to support the entire element board 101. The supporting portion 105 is provided one step higher around the supporting portion 104. For example, a resin material or a ceramic material, $Al_2O_3$ being a typical example, can be used as the material of the supporting member 103. In the present exemplary embodiment, modified polyphenylene ether is used as the material of the supporting member 103 to form the supporting member 103 by molding.

The element board 101 is joined to the supporting member 103 by using an adhesive 107. The adhesive 107 is desirably an adhesive whose main component is epoxy resin having ink resistance.

The element board 101 includes a support substrate 111 and a discharge port formation member 117. A surface layer 112, made of silicon oxide or silicon nitride, is formed on one surface of the support substrate 111, made of silicon. A liquid supply path 115, which is a through hole, is formed in the support substrate 111. A predetermined number of energy generating elements 113 (for example, electrothermal conversion elements or piezoelectric elements) that generate energy for discharging a liquid, such as ink, from discharge ports 114 are disposed on the surface layer 112. The discharge port formation member 117, made of resin, is provided so as to overlap the surface layer 112. The discharge port formation member 117 has the discharge ports 114, and forms a common liquid chamber 116 and pressure chambers 118 between the discharge port formation member 117 and the support substrate 111. The common liquid chamber 116 communicates with the supply path 115 of the support substrate 111 and communicates with the pressure chambers 118. The pressure chambers 118 are provided such that the energy generating elements 113 are positioned in the inside of the pressure chambers 118.

Further, the discharge ports 114 that open toward the outside from the pressure chambers 118 are each provided. The discharge port formation member 117 has discharge port rows 114*a* in which the discharge ports 114 are arranged side by side, and the common liquid chamber 116 extends in a direction parallel to the discharge port rows 114*a*. The supply path 115 of the support substrate 111 communicates with the flow path 106 of the supporting member 103.

In the liquid discharging head 100, a liquid, such as ink, is supplied to each pressure chamber 118 through the flow path 106, the supply path 115, and the common liquid chamber 116 from, for example, a tank (not shown). Then, electric power is selectively supplied to at least one of the energy generating elements 113 through the electric wiring board 102 to drive the at least one of the energy generating elements 113. When electrothermal conversion elements are used as the energy generating elements 113 and when the energy generating elements 113 are driven, the energy generating elements 113 are heated, as a result of which a liquid near the energy generating elements 113 is heated and bubbles inside the pressure chambers 118, and thus liquid droplets are discharged from the discharge ports 114 due to bubbling pressure. In this case, the surface layer 112, made of silicon oxide or silicon nitride, may be also serve as a heat accumulating layer. When piezoelectric elements are used as the energy generating elements 113 and when the energy generating elements 113 are driven, the energy generating elements 113 are mechanically vibrated, as a result of which a liquid near the energy generating elements 113 is subjected to a pressure inside the pressure chambers 118 and is discharged as liquid droplets from the discharge ports 114. In this way, the energy generating elements 113 are selectively driven to discharge liquid droplets and to cause the liquid droplets to adhere to a medium, such as paper, as a result of which, for example, characters, figures, or patterns are formed.

Figure 2A:
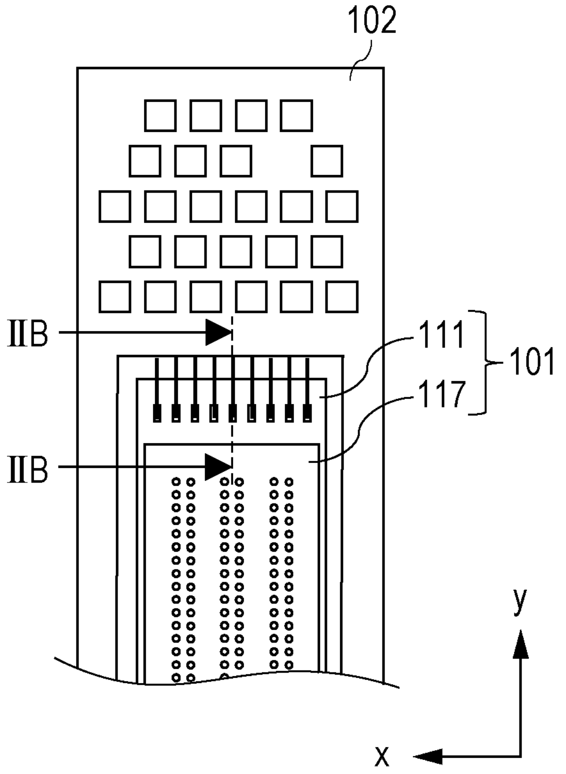
FIG. 2A is a plan view showing an example of an element board and an example of an electric wiring board according to the present disclosure.
Figure 2B:
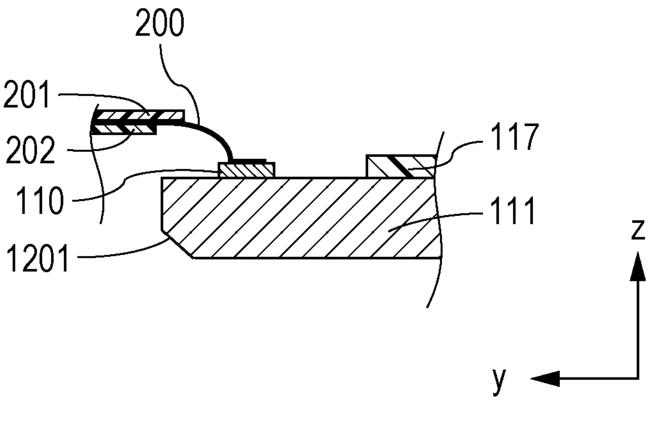
FIG. 2B is a cross-sectional view along line IIB-IIB in FIG. 2A.
Figure 3:
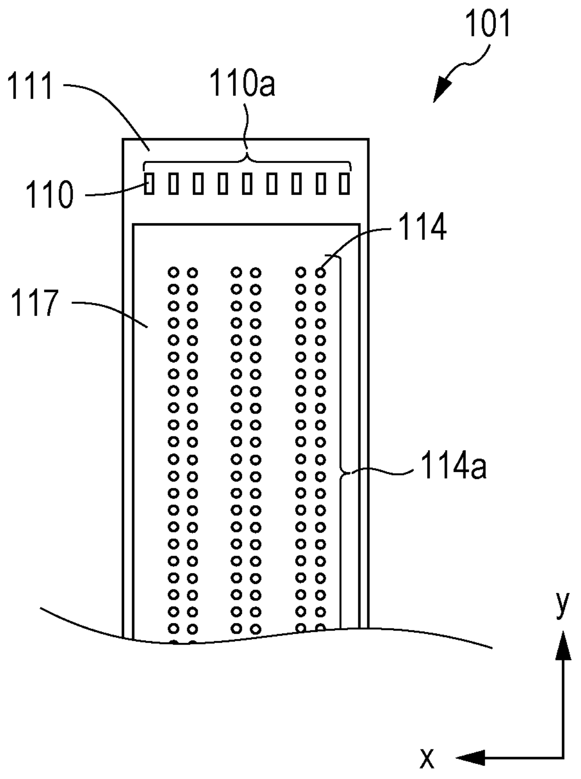
FIG. 3 is a plan view showing an example of the element board according to the present disclosure.
Figure 4A:
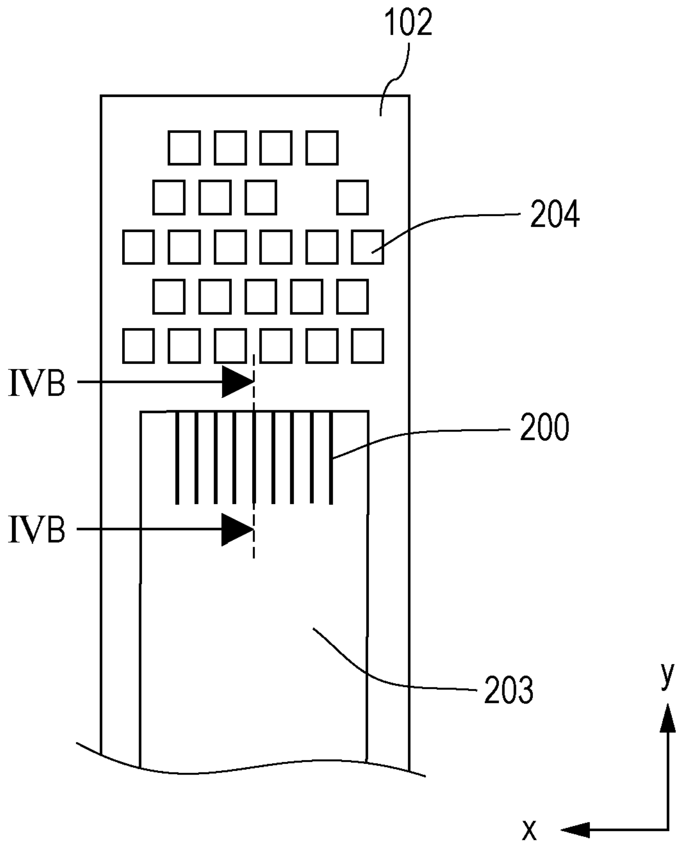
FIG. 4A is a plan view showing an example of the electric wiring board according to the present disclosure.
Figure 4B:
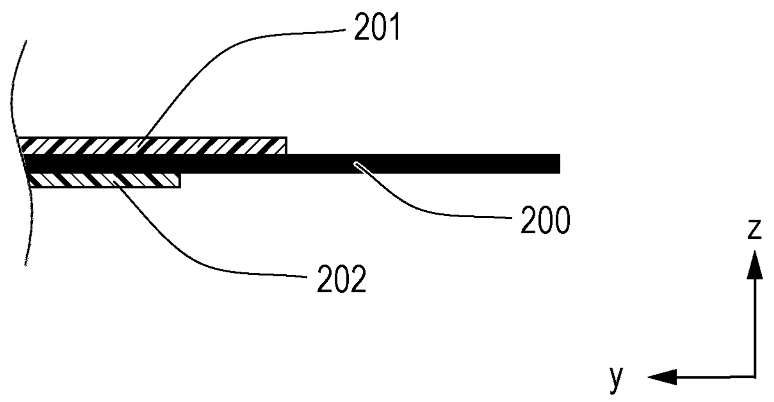
FIG. 4B is a cross-sectional view along line IVB-IVB in FIG. 1A.

FIGS. 2A and 2B each show a state in which the element board 101 and the electric wiring board 102 of the liquid discharging head of the present disclosure are connected to each other. FIG. 2A is a plan view, and FIG. 2B is a cross-sectional view along line IIB-IIB in FIG. 2A. FIG. 3 shows the element board 101 shown in FIG. 2, and FIGS. 4A and 4B show the electric wiring board 102 shown in FIG. 2. As shown in FIG. 2, the element board 101 is connected to the electric wiring board 102 through terminals 110 provided on a surface of the element board 101, the surface being situated on a side where the discharge port formation member 117 is provided.

The electric wiring board 102 is described by using FIGS. 4A and 4B. FIG. 4A is a partial enlarged view of the electric wiring board 102, and FIG. 4B is a cross-sectional view along line IVB-IVB in FIG. 4A. As shown in FIG. 4, the electric wiring board 102 includes a base film 201, a cover film 202, and a lead wiring portion 200 disposed between the base film 201 and the cover film 202. The lead wiring portion 200 is fixed to the base film 201 and the cover film 202 by using an adhesive whose main component is epoxy having a glass solidification temperature of approximately 60° C. to 70° C. The base film 201 and the cover film 202 are made of, for example, insulating organic resin that is bendable, such as a polyimide film. A device hole 203 for exposing the element board 101 is provided in the base film 201 and the cover film 202. An example of the shape of the device hole 203 in the present exemplary embodiment is a substantially rectangular shape for exposing the substantially rectangular element board 101.

At least one side of the device hole 203 is formed such that a part of the lead wiring portion 200 is exposed (FIG. 4A). As shown in FIG. 2B, the exposed lead wiring portion 200 is electrically joined to the terminals 110 on the element board 101. In addition, the electric wiring board 102 is electrically connected to the device body through terminals 204. This makes it possible to supply a drive signal to the element board 101 through the lead wiring portion 200 and the connection terminals 110 from the device body. Note that, as the material of the lead wiring portion 200, a metal wire (electrically conductive member), such as an Al wire, can be used. In the present exemplary embodiment, as the main component of the lead wiring portion 200, Cu is selected. At a connection portion with the terminals 110, the lead wiring portion 200 is subjected to Ni plating and a portion of the lead wiring portion 200 that has been subjected to the Ni plating is subjected to Au plating.

Next, a method of manufacturing the liquid discharging head according to the present disclosure is described.

Formation of Basic Structure of Element Boards

Figure 5:
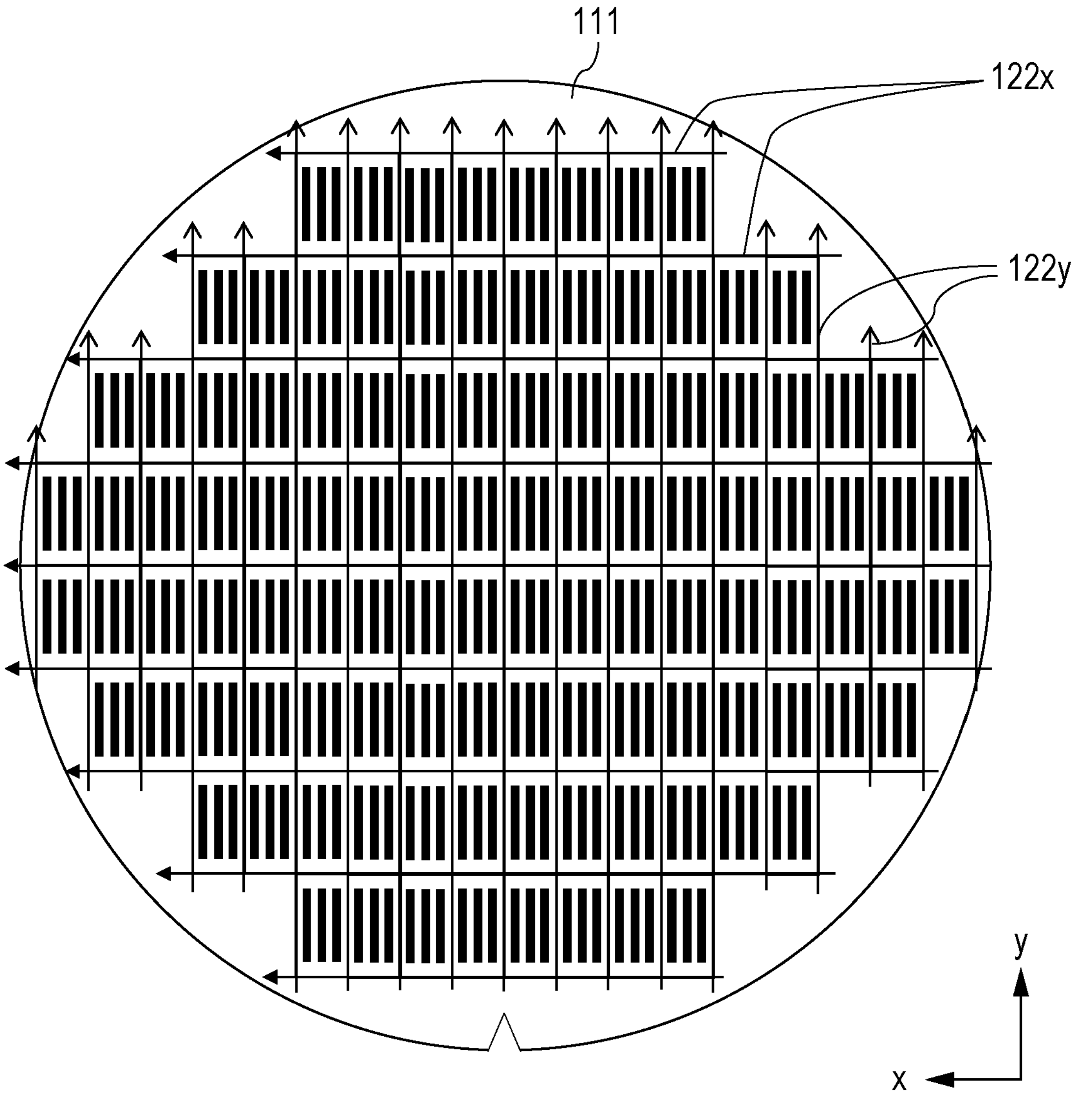
FIG. 5 is a plan view showing part of a method of manufacturing an element board according to the present disclosure.

First, a method of manufacturing element boards 101 is described. As shown in FIG. 5, the element boards 101 are formed by a step of forming cuts along the element boards 101, integrally formed in a wafer 111, along cutting lines 122 and of separating the boards from each other. The cutting lines 122 include cutting lines 122*x* that extend in one direction (for example, a left-right direction in FIG. 5) and cutting lines 122*y* that extend in a direction intersecting the one direction (for example, an up-down direction in FIG. 5). By cutting the wafer 111 along the cutting lines 122, the element boards 101 are obtained.

The step of forming each element board 101 from the wafer 111 is described below.

Figure 6A:
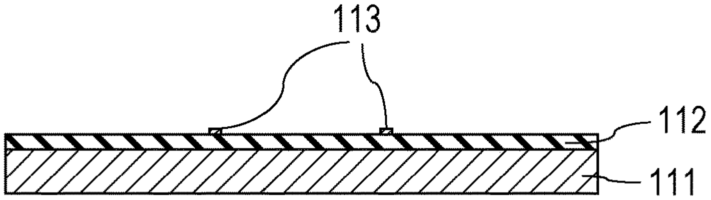
FIG. 6A to FIG. 6G are each a cross-sectional view showing an example of a method of manufacturing the liquid discharging head shown in FIG. 1C.

As shown in FIG. 6A, a wafer 111 that is made of silicon and that has a crystal plane orientation of <100> or <110> is prepared. The wafer 111 is a large-area disk, is a member that is divided into a plurality portions and that becomes a support substrate 111, and is denoted by the same symbol 111 as that of the support substrate. A surface layer 112 that is made of silicon oxide or silicon nitride is formed on one-direction surface (hereunder may also be referred to as “front surface”) of the wafer 111. The surface layer 112 functions as a stop layer in anisotropic etching of the wafer 111 (described below). Then, as shown in FIG. 6A, energy generating elements 113 are disposed at predetermined locations on the surface layer 112. A control-signal input electrode (not shown) for operating each of the energy generating elements 113 is connected to each of the energy generating elements 113. For the purpose of increasing the durability of the energy generating elements 113, various types of functional layers, such as protective layers, may also be further provided. The surface layer 112 can also be used as a protective layer of the energy generating elements 113. In this case, silicon oxide or silicon nitride may be selected as the surface layer 112. Here, a plurality of terminals 110 (see FIG. 3) that are electrically connected to a lead wiring portion of an electric wiring board 102 are also formed on the wafer 111.

Figure 6B:
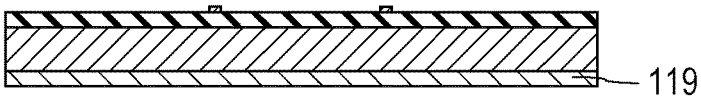
Figure 6C:
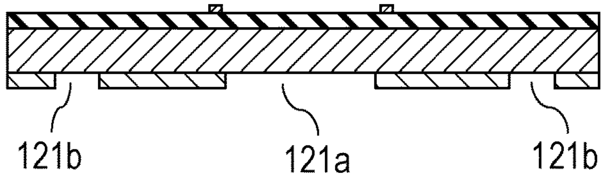

Next, as shown in FIG. 6B, a mask material 119 for forming a supply path 115 and a recessed portion 120 (described below) is provided on a surface (hereunder may also be referred to as “rear surface”) of the wafer 111 opposite to the front surface of the wafer 111 where the energy generating elements 113 are formed. Then, as shown in FIG. 6C, the mask material 119 is subjected to patterning to form mask-material openings 121. The mask-material openings 121 include an opening 121*a* for forming the supply path 115 that is provided in the support substrate 111, and an opening 121*b* for obtaining the recessed portion 120 that is provided in the rear surface of the wafer 111 in correspondence with the cutting lines 122 on the front surface of the wafer 111. The mask material 119 becomes a mask for silicon anisotropic etching, and, for example, a silicon oxide film, a silicon nitride film, or a polyetheramide resin film is suitably used for the mask material 119. When a silicon oxide film or a silicon nitride film is used as the mask material 119, the mask material 119 may be provided on the front surface of the wafer 111 if necessary. The mask material 119 formed on one surface of the wafer 111 may also serve as, for example, the aforementioned protective layer. The mask material 119 is preferably made of a photosensitive material, in which case, the mask-material openings 121 can be precisely formed by photolithography by using, for example, a double-sided mask aligner. As an example in the present exemplary embodiment, a negative photosensitive material is used to provide the mask material 119.

Figure 6D:
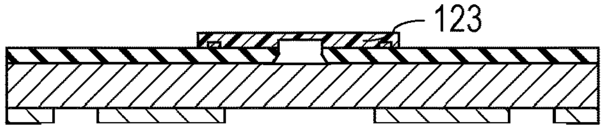

Next, as shown in FIG. 6D, a mold member 123 is formed on the surface layer 112. First, a soluble resin is deposited on the surface layer 112 by a predetermined method. As a deposition method, for example, the soluble resin can be applied by a spin coating method, a direct coating method, or a spraying method, or the soluble resin can be deposited by a roll coating method. Thereafter, the resin formed on the wafer 111 is subjected to patterning so as to be formed into a shape corresponding to a common liquid chamber 116 and pressure chambers 118, as a result of which the mold member 123 is formed. As a method of forming the mold member 123, for example, it is possible to apply a resist and, by exposure and development, form a resist pattern, after which, by etching the resist as a mask, the mold member 123 of a predetermined pattern can be formed. Direct patterning may be performed by using a photosensitive resin, or a resin film may be attached to the wafer 111 to form the mold member 123.

Figure 6E:
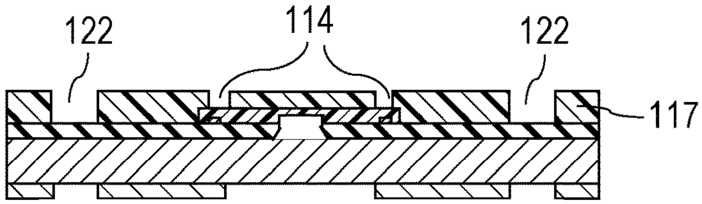

Next, as shown in FIG. 6E, a discharge port formation member 117, made of resin, is formed so as to cover the mold member 123. Since the discharge port formation member 117 is a structural member of the liquid discharging head, the discharge port formation member 117 is required to have characteristics, such as high mechanical strength, heat resisting property, adhesiveness with respect to the wafer 111, resistance against a liquid that is discharged, and not causing deterioration of the liquid. In particular, the discharge port formation member 117 is preferably made of a resin material that strongly adheres to the wafer 111 as a result of being polymerized and hardened by the application of light or heat energy. After manufacturing a film of the discharge port formation member 117, discharge ports 114 and cutting lines 122 are formed. The cutting lines 122 are provided at locations corresponding to the contours of individual element boards 101 to be cut out from the wafer

111, and, by cutting along the cutting lines 122 the wafer 111 provided with the discharge port formation member 117, the plurality of element boards 101 are formed. That is, the element boards 101 are constituted by substrates 111 that are obtained by dividing the wafer 111 along the cutting lines 122, and by the discharge port formation member 117 that is provided on the substrates 111. The cutting lines 122 are groove-shaped cut-out parts provided in the resin material of which the discharge port formation member 117 is made, and may or may not completely extend through the discharge port formation member 117. When the cutting lines 122 do not extend through the discharge port formation member 117, the element boards 101 can be obtained by simultaneously cutting the wafer 111 and the discharge port formation member 117 along the cutting lines 122. Similarly to the patterning of the mold member 123, the discharge ports 114 and the cutting lines 122 can be formed by etching after forming a resist pattern by using a photolithography technology. It is possible to perform direct patterning of a photosensitive material, or to attach a material formed into a film to the wafer 111 to form the discharge ports 114 and the cutting lines 122.

Figure 6F:
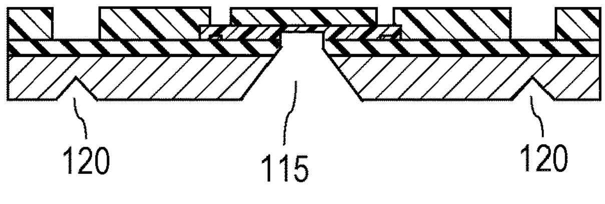

Next, after hardening the discharge port formation member 117, where the discharge ports 114 and the cutting lines 122 are formed, as shown in FIG. 6F, a supply path 115 and a recessed portion 120 are formed simultaneously. The supply path 115 and the recessed portion 120 are formed by anisotropically etching the rear surface of the silicon wafer 111. The anisotropic etching can be performed by wet etching in which the wafer 111 is immersed in a silicon anisotropic etchant, a strong alkaline solution being a typical example. At this time, the front surface of the wafer 111 is protected if necessary. The anisotropic etching of silicon utilizes differences in solubility for crystal orientations with respect to an alkali etchant, and thus the etching stops at a (111) plane where almost no solubility is exhibited. Therefore, due to the plane orientation of a silicon substrate used in the wafer 111, the supply path 115 and the recessed portion 120 to be formed differ in shape. When the crystal plane orientation is <100>, the inclination angle $\theta$=54.7 degrees with respect to the wafer front surface, and, when the crystal plane orientation is <110>, the inclination angle $\theta$=90 degrees with respect to the wafer front surface.

Figure 6G:
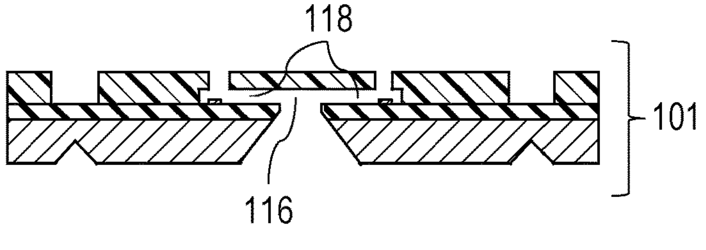

Thereafter, as shown in FIG. 6G, by dissolving the mold member 123, the basic structure of the element boards 101 including a common liquid chamber 116, pressure chambers 118, energy generating elements 113, and discharge ports 114 is formed on the wafer 111.

Cutting of Wafer

Next, the wafer 111 is cut to divide the wafer 111 into the plurality of element boards 110 (dicing). First, in order to prevent the plurality of element boards 101 from being scattered from each other after the cutting, the rear surface of the wafer 111 is attached to an adhesive surface of a dicing tape 51 (see FIGS. 7 and 8). The dicing tape 51 is, in general, a tape in which a bonding layer, made of an acrylic material having adhesiveness, is formed on a resin base material, and the wafer 111 is held and fixed by the bonding layer. Next, while rotating a dicing blade 125, the dicing blade 125 is moved along the cutting lines 122 that are positioned between adjacent element boards 101. The dicing blade 125 is inserted from a front-surface side of the wafer 111. Here, in order to prevent the element boards 101 from being scattered from each other, a cut amount of the dicing blade 125 is controlled such that the entire dicing tape 51 is not cut. Therefore, the wafer 111 fixed to the dicing tape 51 is cut into element boards 101 of a predetermined size. Thereafter, after washing the wafer 11 with pure water, the element boards are cut out one by one.

FIGS. 7A to 7D are each a schematic view of a dicing step in a comparative example in which a recessed portion 120 is not formed on the cutting lines 122, and FIGS. 8A to 8D are each a schematic view of a dicing step in the present disclosure in which a recessed portion 120 is formed on lower ends of the cutting lines 122. As described above, the dicing blade 125 is moved along the cutting lines 122 to perform dicing on the wafer 111.

Figure 7A:
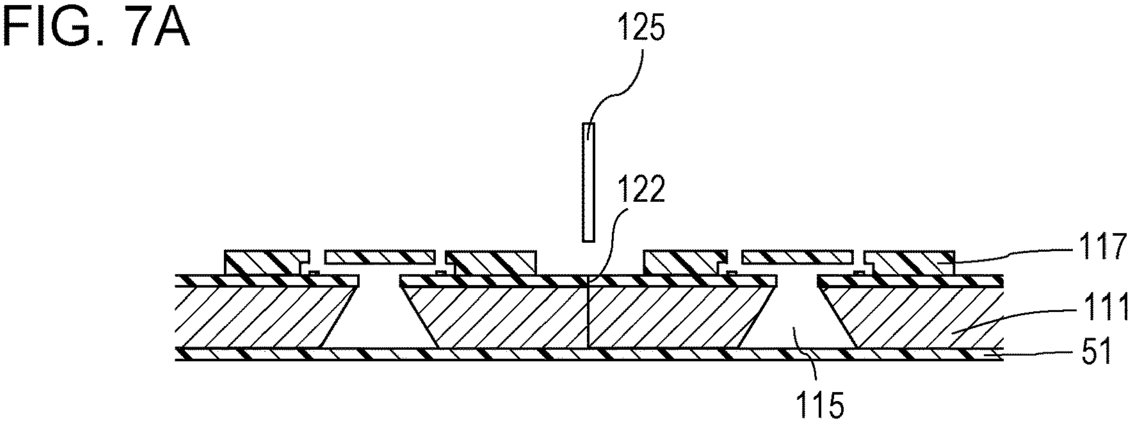
FIG. 7A to FIG. 7D show steps according to a comparative example, the steps following the step in FIG. 6G in the method of manufacturing the liquid discharging head shown in FIG. 1C.
Figure 7B:
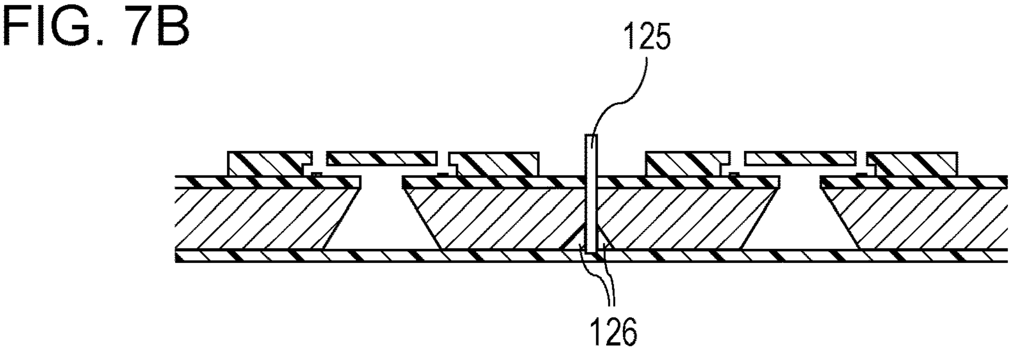
Figure 7C:
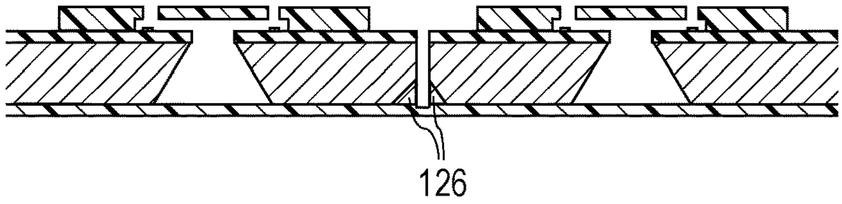
Figure 7D:
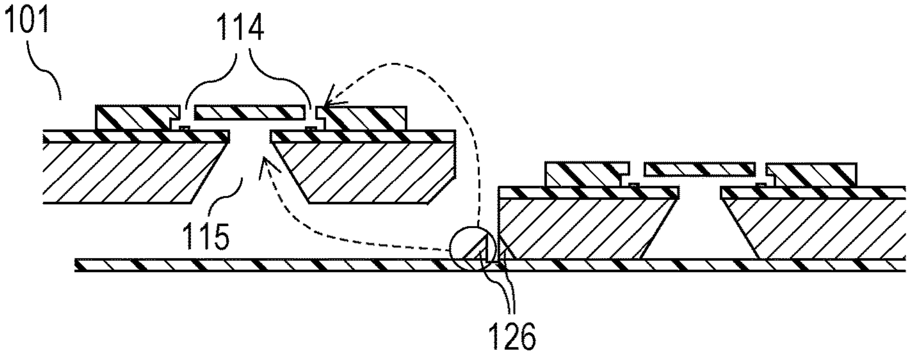
Figure 8A:
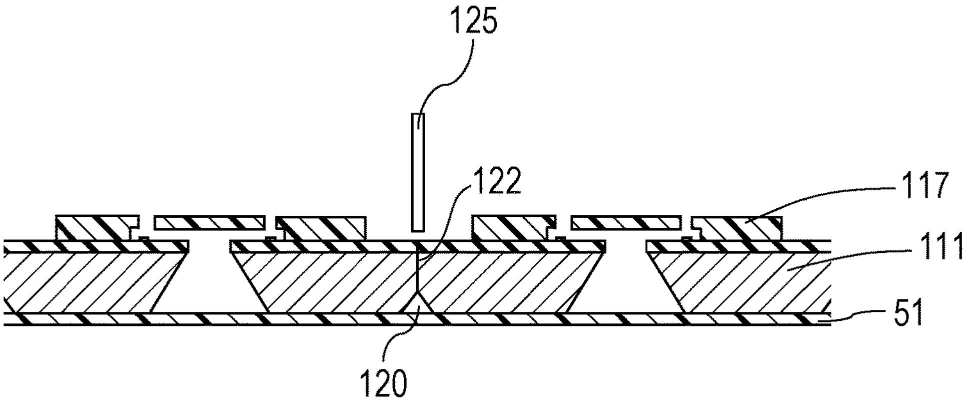
FIG. 8A to FIG. 8D show steps according to the present disclosure, the steps following the step in FIG. 6G in the method of manufacturing the liquid discharging head shown in FIG. 1C.
Figure 8B:
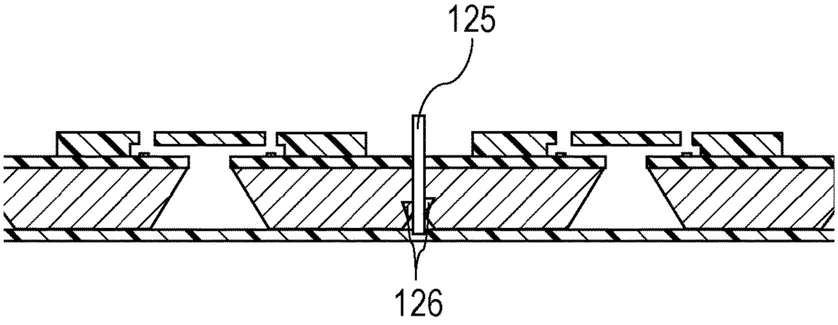

In the dicing step, a fragment 126 may be formed due to cracking of an end portion of the wafer 111 at a lower end of the wafer 111 (FIGS. 7B and 8B). In the comparative example shown in FIGS. 7A to 7D, since the fragment 126 is adhered to the dicing tape 51, the fragment 126 may remain on the dicing tape 51 even after washing the wafer 111 (FIG. 7C). In this case, when the element boards are cut out one by one from the wafer, the remaining fragment 126 may move into a flow path inside an element board 101, including the discharge ports 114 or the supply path 115.

Depending upon the size of the fragment 126 or the location of adhesion of the fragment 126 inside the flow path, in the manufactured liquid discharging head 100, when a liquid, such as ink, is actually discharged, a discharging failure may occur when the fragment 126 inside the flow path hinders the formation of liquid droplets.

Figure 8C:
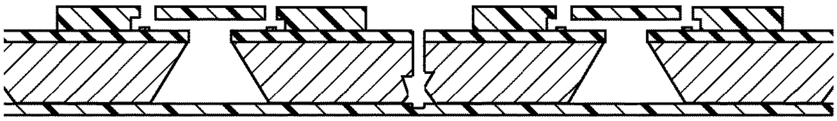
Figure 8D:
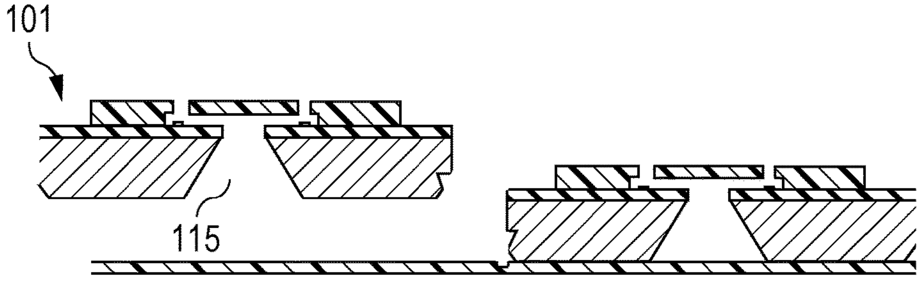

On the other hand, in the present disclosure shown in FIGS. 8A to 8D, a recessed portion 120 is formed in the rear surface of the wafer 111 along the cutting lines 122. Therefore, unlike the above-described comparative example, the fragment 126 is not adhered to the dicing tape 51, and is removed from the wafer 111 when washing the wafer 111 (FIG. 8C). Consequently, when the element boards are cut out one by one from the wafer (FIG. 8D), the fragment 126 is prevented from moving into the flow path inside an element board 101.

Dimensions of Recessed Portion and Dicing Blade

Figure 9A:
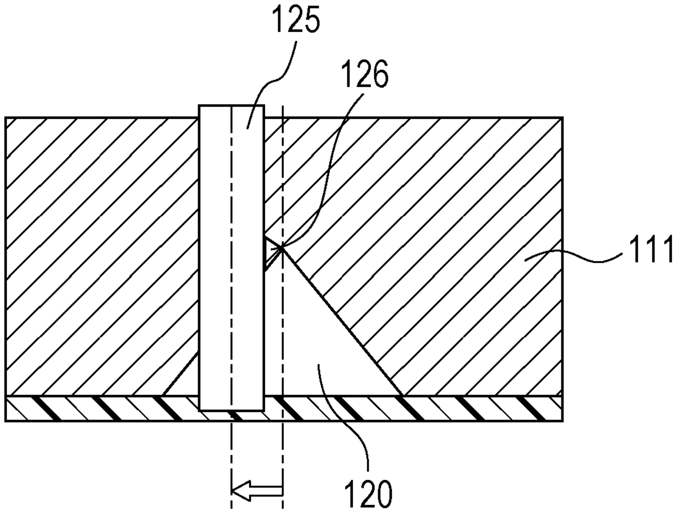
FIG. 9A and FIG. 9B are each an enlarged view showing a step of cutting a wafer in a method of manufacturing the liquid discharging head shown in FIG. 1.
Figure 9B:
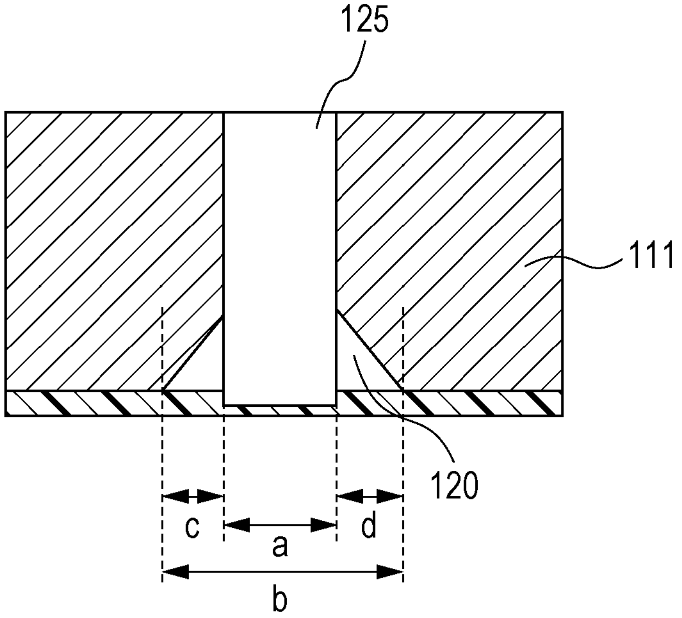

A more preferable structure for suppressing occurrence of failure in the cutting step of the wafer 111 described above is described. As shown in FIG. 9A, when the recessed portion 120 that is provided in the rear surface of the wafer 111 has a triangular cross-sectional shape that tapers toward the front surface of the wafer, a displacement may occur between an apex of the recessed portion 120 and the center of the dicing blade 125. When the dicing blade 125 does not pass through the apex of the recessed portion 120, the vicinity of the apex of the recessed portion 120 remains without being eliminated, as a result of which a fragment 126 is formed. In order to suppress formation of a fragment 126, it is preferable that the dicing blade 125 pass through the apex of the recessed portion 120. Specifically, as shown in FIG. 9B, a thickness of the dicing blade 125 is a, and a width (dimension in a width direction orthogonal to a longitudinal direction) of the recessed portion 120 is b. Further, on two sides of the dicing blade 125, an interval between a width-direction end portion of the recessed portion 120 and a width-direction end portion of the dicing blade 125 and an interval between a width-direction end portion of the recessed portion 120 and a width-direction end portion of the dicing blade 125 are c and d, respectively. In addition, it is preferable that the dimensions a, b, and c satisfy the relationship of $a \geq b/3$, $c < b/2$, and $d < b/2$. When the width-direction dimension b of the recessed portion 120 is 100 μm to 200 μm, it is preferable that the thickness a of the dicing blade 125 be 55 μm or greater. Due to such a structure, the dicing blade 125 passes through the apex of the recessed portion 120 whose cross-sectional shape is triangular and easily cuts the wafer 111. As a result, it is possible to cut the wafer with high precision where formation of a fragment 126 is suppressed.

Figure 10:
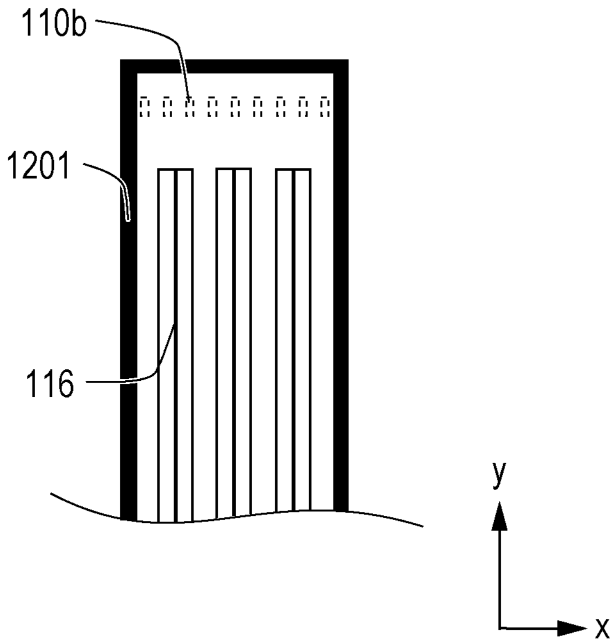
FIG. 10 is a plan view showing an example of an element board according to the present disclosure.

An element board 101 formed by the manufacturing method above when seen from a discharge-port-formation-member-117 side (may hereunder be also referred to as "front-surface side") is shown in FIG. 3, and an element board 101 when seen from a side opposite to the discharge-port-formation-member-117 side (may hereunder be also referred to as "rear-surface side") is shown in FIG. 10. Note that, in FIG. 10, a region 110*b* corresponding to a portion where terminals 110 are formed on the front surface is denoted by dotted lines. As shown in FIG. 10, the element board 101 has, at its outer peripheral portion of its rear surface, a slope 1201 resulting from the recessed portion 120 formed in the rear surface of the wafer 111 in the manufacturing process.

The element board 101 after the cutting is adhered to a supporting member 103 with an adhesive 107. The adhesive 107 is desirably a thermosetting adhesive whose main component is epoxy resin having low viscosity, low hardening temperature, and ink resistance. Next, the element board 101 and an electric wiring board 102 for driving the energy generating elements 113 are connected to each other, and sealing for protecting the connection portion is performed, as a result of which a liquid discharging head is completed.

Joining of Element Board and Electric Wiring Board

Next, a joining step of joining an element board 101 and an electric wiring board 102 to each other is described.

Figure 11A:
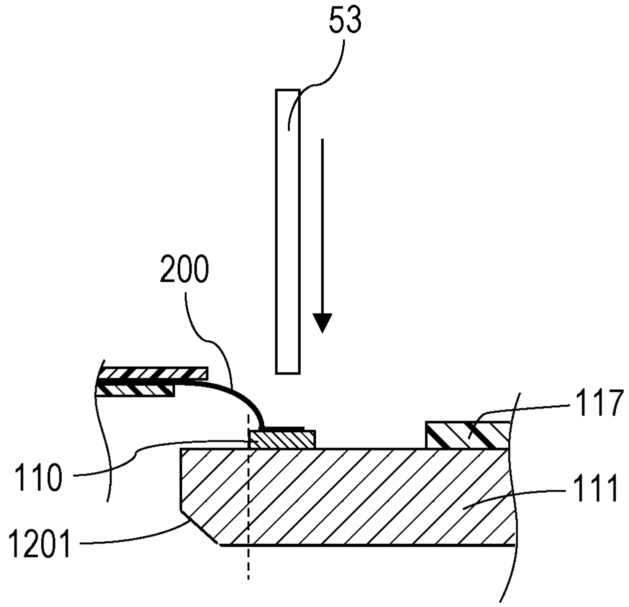
FIG. 11A and FIG. 11B are each a cross-sectional view showing a step of joining an element board and an electric wiring board according to the present disclosure to each other.

The element board 101 (support substrate 111) and the electric wiring board 102 can be joined to each other by bonding. As described above, FIGS. 2A and 2B show a state in which the element board 101 and the electric wiring board 102 are joined to each other by the lead wiring portion 200, and FIG. 2A shows the state when seen from the front-surface side, and FIG. 2B is a cross-sectional view along line IIB-IIB in FIG. 2A. The joining is performed by positioning the lead wiring portion 200 onto a predetermined position on terminals 110 on the front surface of the support substrate 111, and by pushing the lead wiring portion 200 against the terminals 110 with a hone 53 having a bonding tool. In the present exemplary embodiment, as an example, as shown in FIG. 11, a load of approximately 10 N to 50 N is applied to the terminals 110 from the ultrasonically vibrated hone 53 beyond the lead wiring portion 200, the terminals 110 being heated to 100° C. to 300° C. and being made of Au. Therefore, an Au layer of the terminals 110 and an Au layer, which is an outermost surface, of the lead wiring portion 200 are joined to each other by diffusion, as a result of which an electrical connection is realized.

Figure 11B:
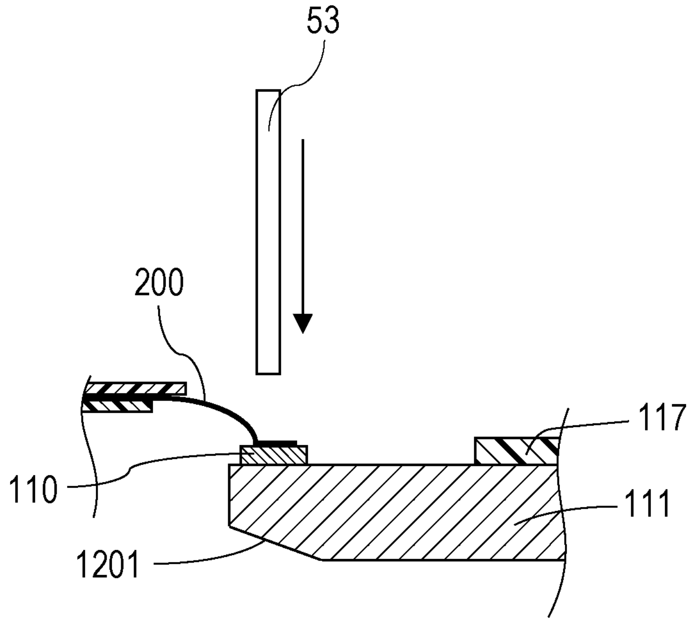
Figure 12:
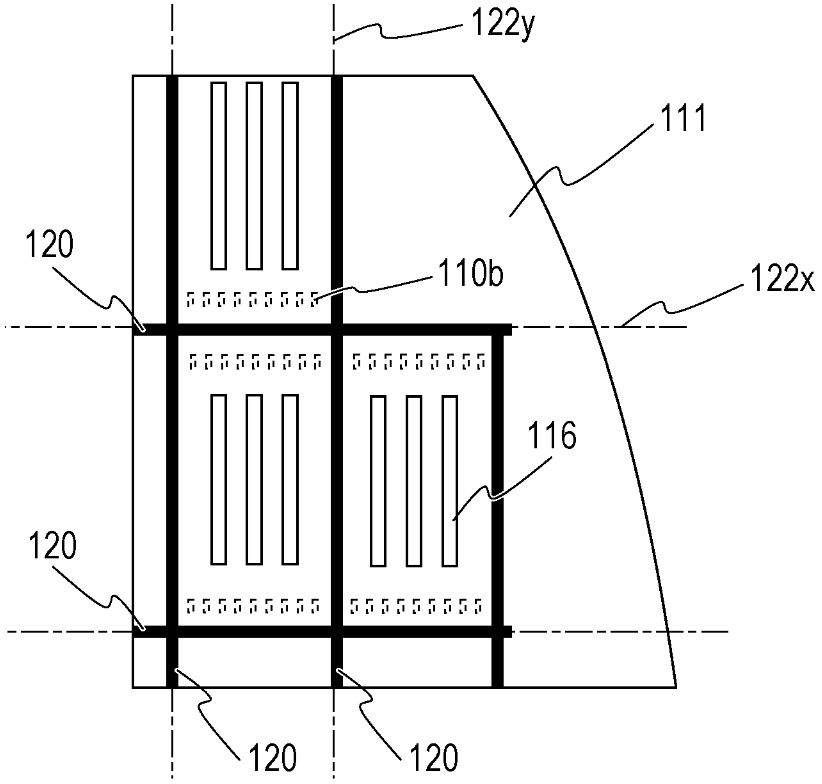
FIG. 12 is an enlarged view showing part of a method of manufacturing an element board according to the present disclosure.

As described above, at the time of the joining, a load is applied to a location directly below the terminals 110. Here, as shown in the cross-sectional view of FIG. 2B, the support substrate 111 of the element board 101 has, at its end of its outer peripheral portion, a slope 1201 resulting from the recessed portion 120 at the time of the cutting step of the wafer 111. Therefore, when, when seen from a direction perpendicular to the front surface of the element board 101, when the slope 1201 exists directly below the terminals 110, a load that is applied at the time of the joining may crack an end portion of the element board 101 (support substrate 111). FIG. 11B is a cross-sectional view at the time of joining the element board 101 and the electric wiring board 102 to each other when the slope 1201 exists directly below the terminals 110. Here, in the present disclosure, in order to prevent the slope 1201 from being formed directly below the terminals 110, a recessed portion 120 that is formed in correspondence with the cutting lines 122 on the wafer 111 is formed at a location where the recessed portion 120 does not overlap the terminals 110 when seen from a direction perpendicular to the front surface of the wafer 111. FIG. 12 is a plan view of the wafer 111 when seen from the rear-surface side of the wafer 111, the wafer 111 having recessed portions 120. The recessed portions 120 are formed at locations where the recessed portions 120 do not overlap a region 110*b* corresponding to the terminals 110 on the front surface, and, from here, the element board 101 shown in FIG. 10 is formed.

In FIG. 10, the slope 1201 is formed at a location where the slope 1201 does not overlap the terminals 110 disposed on the front surface, and, on a side where the terminals 110 on the support substrate 111 are arranged in a row, the slope 1201 is formed further toward an outer peripheral side than the row of terminals 110. Therefore, when the element board 101 and the lead wiring portion 200 are joined to each other, the load from the hone 53 can be received by a flat portion of the rear surface of the support substrate 111 and an end portion of the support substrate 11 is unlikely to be cracked.

Note that, in the element board 101 in the present exemplary embodiment, although a terminal row 110*a* in which the plurality of terminals 110 are arranged side by side in a row is formed so as to be disposed in a direction orthogonal to the discharge port rows 114*a*, the orientation of the terminal row 110*a* with respect to the discharge port rows 114*a* is not limited thereto. For example, application can be suitably made to a liquid discharging head and an element board 101, in which the terminals 110 are formed so as to be arranged side by side in a direction substantially parallel to the discharge port rows 114*a*.

When the element board 101 and the electric wiring board 102 are joined to each other, as long as the joining operation is one that applies a load to the element board, the present disclosure can be suitably applied even if a bonding method other than inner lead bonding described above, such as wire bonding, is performed.

As described above, according to the present disclosure, it is possible to suppress formation of a fragment at the time of wafer dicing, and to suppress an end portion of the element board 101 from being cracked when the element board 101 and the electric wiring board 102 are joined to each other.

Modifications 1 to 4, in each of which the location of formation of a slope 1201 on the rear surface of the support substrate 110 differ from that in FIG. 10, are described below.

Modification 1

A modification of the liquid discharging head of the present disclosure (Modification 1) is described with reference to FIGS. 13A to 13E. Hereunder, portions in Modification 1 that differ from the above-described structures are primarily described, and portions in Modification 1 that are similar to the above-described structures are not described.

Figure 13A:
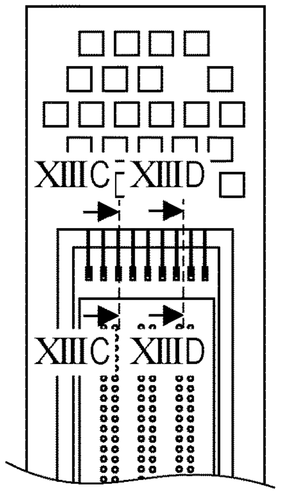
FIGS. 13A to 13E each show a liquid discharging head of Modification 1 of the present disclosure.
Figure 13B:
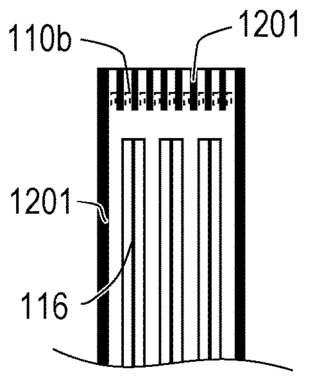
Figure 13C:
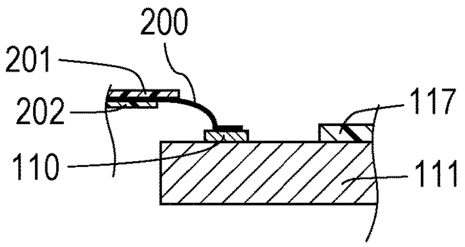
Figure 13D:
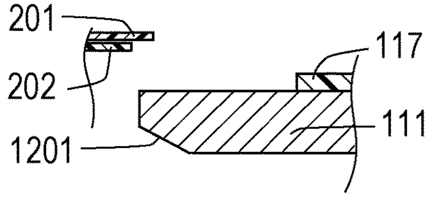

FIG. 13A shows a state in which an element board 101 and an electric wiring board 102 are joined to each other by a lead wiring portion 200, and FIG. 13B is a partial schematic view of the element board 101 when seen from the rear surface side. In the present exemplary embodiment, a slope is formed between portions of a region 110*b* where terminals 110 are positioned on the front surface. FIG. 13C is a cross-sectional view of a location that overlaps the terminals 110 along line XIIIC-XIIIC in FIG. 13A, and FIG. 13D is a cross-sectional view of a location that does not overlap the terminals 110 along line XIIID-XIIID in FIG.

Figure 13E:
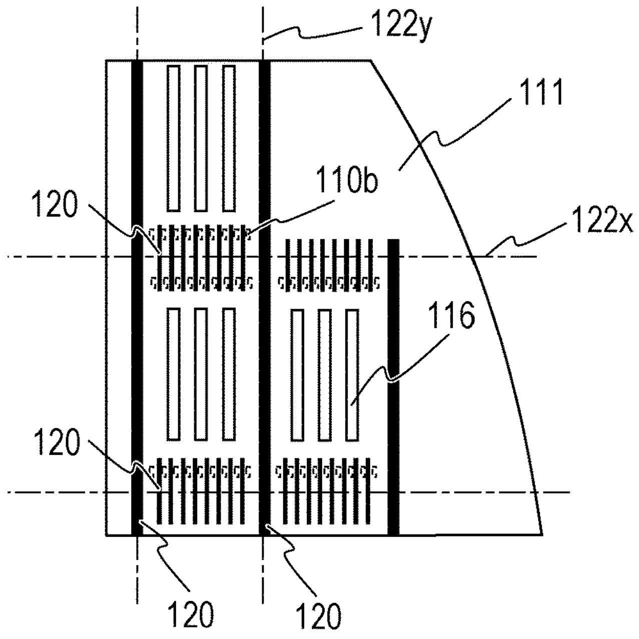

13A. FIG. 13E is a plan view of a wafer 111 when seen from the rear surface side of the wafer 111, the wafer 111 having recessed portions 120. Even in this case, similarly to the above-described structure, the slope 1201 is not formed directly below the terminals 110. Therefore, when the element board 101 and the lead wiring portion 200 are joined to each other, the effect of the present disclosure of preventing an end portion of the support substrate 111 from being cracked by a load applied from the hone 53 can be obtained. Further, when the outer peripheral portion of the support substrate 111 has a flat portion that does not have a slope 1201, it is possible to obtain the effect of increasing the rigidity of the end portion of the support substrate 111 compared to when the entire outer peripheral portion has the slope 1201 as in FIG. 10.

Modification 2

A different modification of the liquid discharging head of the present disclosure (Modification 2) is described with reference to FIGS. 14A to 14C. Hereunder, portions in Modification 2 that differ from the above-described structures are primarily described, and portions in Modification 2 that are similar to the above-described structures are not described.

Figure 14A:
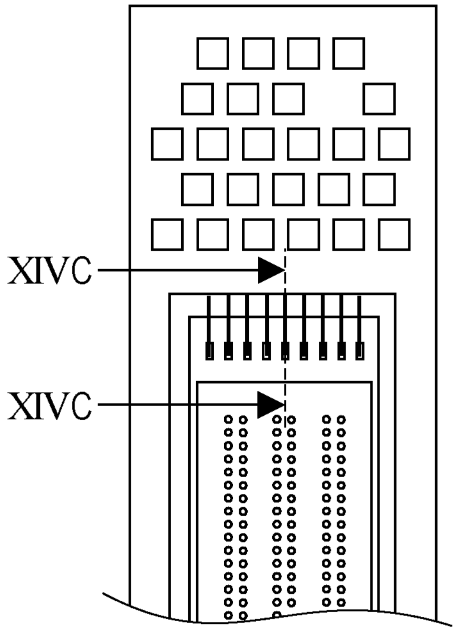
FIGS. 14A to 14C each show a liquid discharging head of Modification 2 of the present disclosure.
Figure 14B:
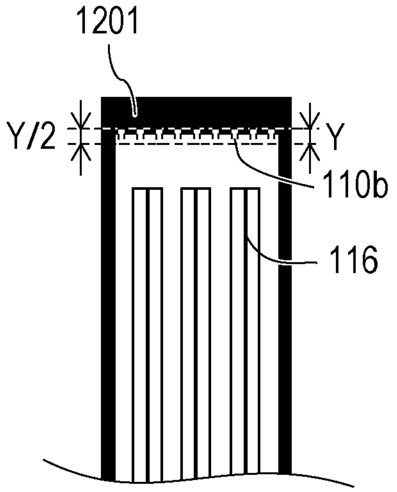
Figure 14C:
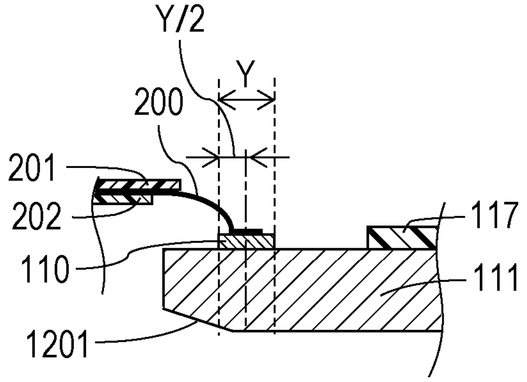

FIG. 14A shows a state in which an element board 101 and an electric wiring board 102 are joined to each other by a lead wiring portion 200, and FIG. 14B is a partial schematic view of the element board 101 when seen from the rear surface side. In Modification 2, a slope 1201 on a side of the support substrate 110 in a direction along a terminal row 110*a* (hereunder may also be referred to as "first side") is formed at a location where the slope 1201 partly overlaps terminals 110 when seen from a direction perpendicular to a substrate surface. FIG. 14C is a cross-sectional view of a location that overlaps the terminals 110 along line XIVC-XIVC in FIG. 14A. As shown in FIG. 14C, when a length in a direction orthogonal to the terminal row 110*a* of the terminals 110 (direction y in FIG. 14C) is Y, the slope 1201 does not reach a location that overlaps the central point of Y. In this case, when a load is applied from the hone 53, when seen from the direction perpendicular to the substrate surface, an area more than or equal to half of the area of the terminals 110 can receive the load by the flat portion of the rear surface of the support substrate 111. Therefore, compared to when the terminals 110 are formed at a location where the terminals 110 completely overlap the slope 1201 as shown in FIG. 11B, when the element board 101 and the lead wiring portion 200 are joined to each other, the effect of the present disclosure of preventing an end portion of the support substrate 111 from being cracked by a load applied from the hone 53 can be obtained. In this case, in manufacturing a liquid discharging head, the element board 101 is formed such that, when seen from the direction perpendicular to the front surface of the wafer 111, the area of a region where the terminals 110 overlap a recessed portion 120 becomes smaller than the area of a region where the terminals 110 do not overlap the recessed portion.

Modification 3

A different modification of the liquid discharging head of the present disclosure (Modification 3) is described with reference to FIGS. 15A to 15E. Hereunder, portions in Modification 3 that differ from the above-described structures are primarily described, and portions in Modification 3 that are similar to the above-described structures are not described.

Figure 15A:
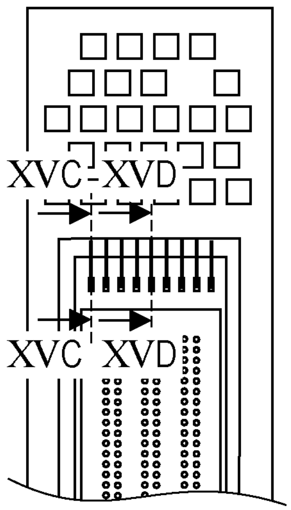
FIGS. 15A to 15E each show a liquid discharging head of Modification 3 of the present disclosure.
Figure 15B:
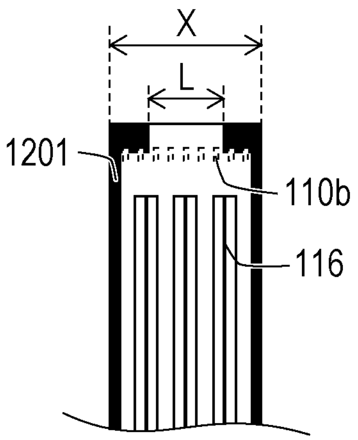
Figure 15C:
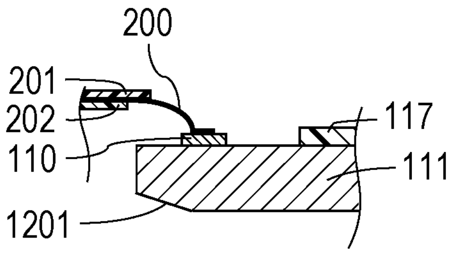
Figure 15D:
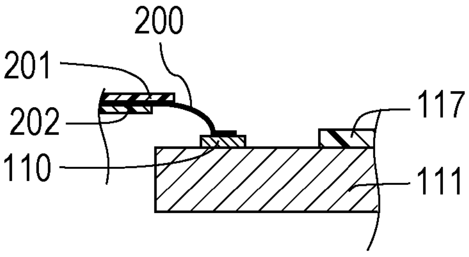
Figure 15E:
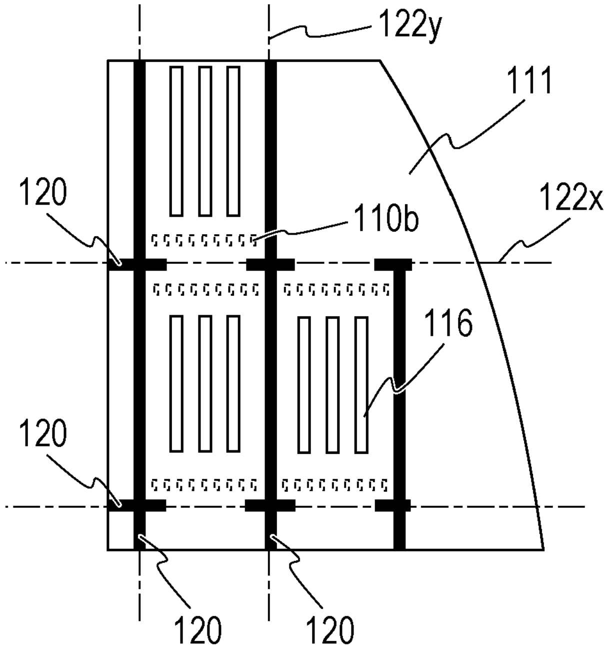

FIG. 15A shows a state in which an element board 101 and an electric wiring board 102 are joined to each other by a lead wiring portion 200, and FIG. 15B is a partial schematic view of the element board 101 when seen from the rear surface side. In Modification 3, a slope 1201 formed on the rear surface on a side of the support substrate 110 in a direction along a terminal row 110*a* stops at the center of the side. FIG. 15C is a cross-sectional view of a location where the slope 1201 is formed along line XVC-XVC in FIG. 15A, and FIG. 15D is a cross-sectional view of a location where the slope 1201 is not formed along line XVD-XVD in FIG. 15A. FIG. 15E is a plan view of a wafer 111 when seen from the rear surface side, the wafer 111 having recessed portions 120. A length in a direction substantially parallel to the terminal row 110*a* (direction x in FIG. 15) of the element board 101 (support substrate 110) is X, and a length where the slope 1201 is not formed on a side where the terminal row 110*a* of the element board 101 is formed is L. In this case, it is preferable that the slope 1201 be formed such that $L \geq X/2$. In order to form such a slope 1201, in the process of manufacturing the element board 101, a recessed portion 120 is formed in the wafer 111 as shown in FIG. 15E. Therefore, since a recessed portion is formed in an end portion of the support substrate 111 where a fragment tends to be formed at the time of dicing, the effect of the present disclosure of suppressing formation of a fragment can be obtained. In addition, on the first side of the support substrate 111 after the dicing, the slope 1201 exists near the center. Therefore, when the element board 101 and the lead wiring portion 200 are joined to each other, the effect of the present disclosure of preventing an end portion of the support substrate 111 from being cracked by a load applied from the hone 53 can be obtained.

Modification 4

A different modification of the liquid discharging head of the present disclosure (Modification 4) is described with reference to FIGS. 16A to 16D. Hereunder, portions in Modification 4 that differ from the above-described structures are primarily described, and portions in Modification 4 that are similar to the above-described structures are not described.

Figure 16A:
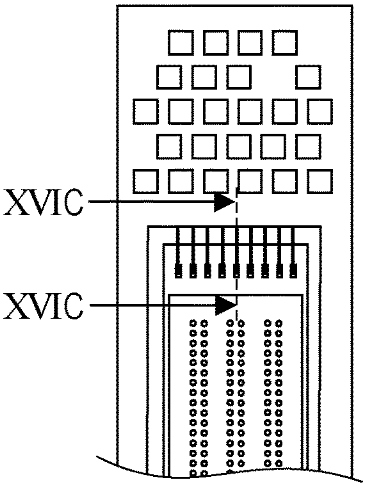
FIGS. 16A to 16D each show a liquid discharging head of Modification 4 of the present disclosure.
Figure 16B:
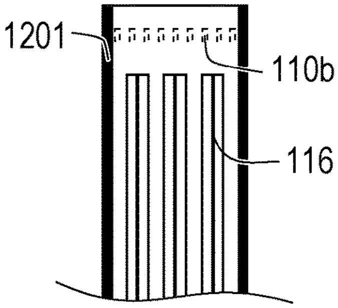
Figure 16C:
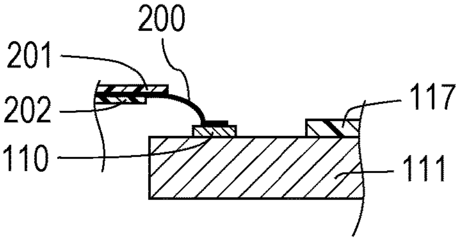
Figure 16D:
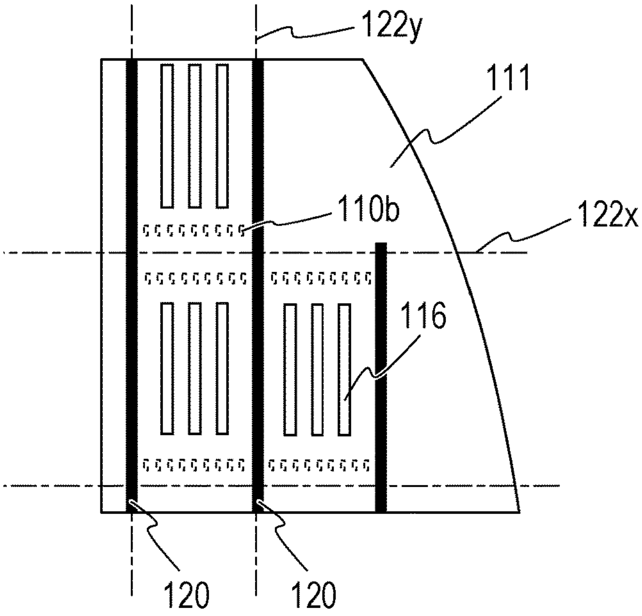

FIG. 16A shows a state in which an element board 101 and an electric wiring board 102 are joined to each other by a lead wiring portion 200, and FIG. 16B is a partial schematic view of the element board 101 when seen from the rear surface side. FIG. 16D is a plan view of a wafer 111 when seen from the rear surface side, the wafer 111 having recessed portions 120. In Modification 4, a slope 1201 is not formed on the first side of the support substrate 110. FIG. 16C is a cross-sectional view along line XVC-XVC in FIG. 16A. In Modification 4, only a side where a terminal row 110*a* is not provided has a slope 1201. In order to form such a slope 1201, in the process of manufacturing the element board 101, a recessed portion 120 is formed in the wafer 111 in correspondence with the cutting line (122*y*) excluding the cutting line (122*x*) that is substantially parallel to the terminal row 110*a* as shown in FIG. 16D. Therefore, the effect of the present disclosure of suppressing formation of a fragment at the time of dicing on a side where the terminal row 110*a* is not provided can be obtained. In addition, since the slope 1201 does not exist on the first side of the support substrate 110 after dicing, when the element board 101 and the lead wiring portion 200 are joined to each other, the effect of the present disclosure of preventing an end portion of the support substrate 111 from being cracked by a load applied from the hone 53 can be obtained.

As described above, according to the present disclosure, it is possible to obtain the effect of making it possible to reduce occurrence of discharge failure caused by formation of a fragment at the time of wafer dicing. In addition, when the element board 101 and the electric wiring board 102 are joined to each other, the effect of suppressing an end portion of the element board 101 from being cracked can be obtained.

According to the present disclosure, it is possible to provide a method of manufacturing a liquid discharging head and the liquid discharging head, which suppress formation of a fragment and which make it unlikely for cracking to occur in joining the element board and the electric wiring board to each other.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-166036, filed Oct. 17, 2022, which is hereby incorporated by reference herein in its entirety.

What is claimed is:

1. A method of manufacturing a liquid discharging head having an element board and an electric wiring board that is electrically connected to the element board, wherein the element board includes a discharge port formation member having a discharge port for discharging liquid and the element board further includes an element configured to supply energy to the discharge port for discharging the liquid, the method comprising:

preparing a wafer that is provided with the element and the discharge port formation member on a front surface of the wafer;

forming a recessed portion in a rear surface of the wafer;

attaching the rear surface of the wafer and a dicing tape;

cutting the wafer along a plurality of cutting lines formed on the front surface of the wafer and forming the element board; and connecting the electric wiring board and a terminal of the element board, wherein, when seen from a direction perpendicular to the front surface of the wafer, the recessed portion is formed at a location corresponding to the plurality of cutting lines, and an area of a region where the terminal overlaps the recessed portion is smaller than an area of a region where the terminal does not overlap the recessed portion, and wherein the plurality of cutting lines are provided at locations corresponding to contours of the element board.

2. The method according to claim 1, wherein connecting includes bonding the electric wiring board to the terminal of the element board.

3. The method according to claim 2, wherein bonding includes inner lead bonding.

4. The method according to claim 1, wherein cutting includes using a dicing blade to cut the wafer.

5. The method according to claim 4, wherein, when a designates a thickness of the dicing blade, b designates a dimension of the recessed portion in a width direction orthogonal to a longitudinal direction, and, on two sides of the dicing blade, c designates an interval between a width-direction end portion of the recessed portion and a width-direction end portion of the dicing blade, and d designates an interval between a width-direction end portion of the recessed portion and a width-direction end portion of the dicing blade, the following is satisfied:

$a \geq b/3$, $c < b/2$, and $d < b/2$.

6. The method according to claim 4, wherein the recessed portion has a triangular cross-sectional shape that tapers toward the front surface from the rear surface of the wafer, and wherein the dicing blade cuts the wafer by passing through an apex of the recessed portion having the triangular cross-sectional shape.

7. The method according to claim 1, wherein the element board includes a terminal row in which terminals are arranged side by side in a row along one side of the element board, wherein, when seen from the direction perpendicular to the front surface of the wafer, of the plurality of cutting lines, a cutting line that is substantially parallel to the terminal row has a region where the recessed portion is not formed, and wherein, when X designates a length of one side of the element board where the terminal row is formed, and L designates a length of the region where the recessed portion is not formed on the one side where the length is in a direction parallel to the one side, the following is satisfied: $L \geq X/2$.

8. The method according to claim 1, wherein the element board includes a terminal row in which terminals are arranged side by side in a row along one side of the element board, and wherein, when seen from the direction perpendicular to the front surface of the wafer, the recessed portion is formed at a location corresponding to, of the plurality of cutting lines, a cutting line excluding a cutting line that is substantially parallel to the terminal row.

9. A method of manufacturing a liquid discharging head having an element board and an electric wiring board that is electrically connected to the element board, wherein the element board includes a discharge port formation member having a discharge port for discharging liquid and the element board further includes an element configured to supply energy to the discharge port for discharging the liquid, the method comprising:

preparing a wafer that is provided with the element and the discharge port formation member on a front surface of the wafer;

forming a recessed portion in a rear surface of the wafer;

attaching the rear surface of the wafer and a dicing tape;

cutting the wafer along a plurality of cutting lines formed on the front surface of the wafer and forming the element board; and connecting the electric wiring board and a terminal of the element board, wherein, when seen from a direction perpendicular to the front surface of the wafer, the recessed portion is formed at a location corresponding to the plurality of cutting lines, and an area of a region where the terminal overlaps the recessed portion is smaller than an area of a region where the terminal does not overlap the recessed portion, and wherein the recessed portion is formed by wet etching of the wafer.

10. The method according to claim 9, wherein the element board has a supply path configured to supply liquid to the discharge port formation member, and forming the recessed portion includes simultaneously forming the supply path of the element board and the recessed portion.

11. A method of manufacturing a liquid discharging head having an element board and an electric wiring board that is electrically connected to the element board, wherein the element board includes a discharge port formation member having a discharge port for discharging liquid and the element board further includes an element configured to supply energy to the discharge port for discharging the liquid, the method comprising:

preparing a wafer that is provided with the element and the discharge port formation member on a front surface of the wafer;

forming a recessed portion in a rear surface of the wafer;

attaching the rear surface of the wafer and a dicing tape;

cutting the wafer along a plurality of cutting lines formed on the front surface of the wafer and forming the element board; and connecting the electric wiring board and a terminal of the element board, wherein, when seen from a direction perpendicular to the front surface of the wafer, the recessed portion is formed at a location corresponding to the plurality of cutting lines, and an area of a region where the terminal overlaps the recessed portion is smaller than an area of a region where the terminal does not overlap the recessed portion, and wherein the plurality of cutting lines is groove-shaped cut-out parts provided in a resin material of which the discharge port formation member is made.

* * * * *